(12) United States Patent
Dahlstedt (10) Patent No.: US 9,875,122 B2
(45) Date of Patent: *Jan. 23, 2018

(54) SYSTEM AND METHOD FOR PROVIDING HARDWARE VIRTUALIZATION IN A VIRTUAL MACHINE ENVIRONMENT

(71) Applicant: ORACLE INTERNATIONAL CORPORATION, Redwood Shores, CA (US)

(72) Inventor: Joakim Dahlstedt, Stockholm (SE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 668 days.

This patent is subject to a terminal disclaimer.

(21) Appl. No.: 14/172,711

(22) Filed: Feb. 4, 2014

(65) Prior Publication Data

US 2014/0157272 A1    Jun. 5, 2014

Related U.S. Application Data

(63) Continuation of application No. 13/551,412, filed on Jul. 17, 2012, now Pat. No. 8,806,493, which is a (Continued)

(51) Int. Cl.
  *G06F 9/46* (2006.01)
  *G06F 9/455* (2006.01)
  *G06F 9/50* (2006.01)

(52) U.S. Cl.
  CPC .......... *G06F 9/45533* (2013.01); *G06F 9/505* (2013.01)

(58) Field of Classification Search
  CPC .............................. G06F 9/45533; G06F 9/505
  See application file for complete search history.

(56) References Cited

U.S. PATENT DOCUMENTS 6,075,938 A * 6/2000 Bugnion ................. G06F 9/544
                                                                  703/27
6,279,013 B1   8/2001 LaMarca
(Continued)

FOREIGN PATENT DOCUMENTS

CN         1286426 A    3/2001
EP         1508855      2/2003

OTHER PUBLICATIONS

Hand, et al., Controlling the XenoServer Open Platform, 2003, pp. 3-10.
(Continued)

*Primary Examiner* — James J Lee
(74) *Attorney, Agent, or Firm* — Tucker Ellis LLP (57) ABSTRACT

A system and method for providing hardware virtualization and resource management in a virtual machine environment. An application server environment is extended to provide an interface from the higher layers in the application server environment to the system's actual processing power, such that the allocation of processing can be made in a machine-independent way. A layer of software can be placed between the virtual machine and the hardware that improves the efficiency of the virtualized Java execution system. The system comprises two main components: a first, lower-level, execution environment that replaces the usual operating system; and a second, higher-level, resource broker that is responsible for handing out new virtual machines to the above layers, and for monitoring the current resource usage of the running virtual machines.

18 Claims, 5 Drawing Sheets

Related U.S. Application Data continuation of application No. 11/835,307, filed on Aug. 7, 2007, now Pat. No. 8,250,572.

(60) Provisional application No. 60/821,673, filed on Aug. 7, 2006.

(56) References Cited

U.S. PATENT DOCUMENTS

| | | | |
|---|---|---|---|
| 6,622,015 | B1 | 9/2003 | Himmel |
| 6,732,139 | B1 | 5/2004 | Dillenberger |
| 6,931,544 | B1* | 8/2005 | Kienhofer ............ G06F 9/44563 |
| | | | 717/118 |
| 7,050,835 | B2 | 5/2006 | Hack |
| 7,840,772 | B2* | 11/2010 | Rao ....................... G06F 9/5016 |
| | | | 711/152 |
| 7,865,893 | B1* | 1/2011 | Omelyanchuk ..... G06F 11/3644 |
| | | | 710/1 |
| 2002/0015019 | A1 | 2/2002 | Kinjo |
| 2002/0055938 | A1 | 5/2002 | Matsuo |
| 2003/0033441 | A1* | 2/2003 | Forin .................. G06F 9/44521 |
| | | | 719/315 |
| 2003/0234777 | A1 | 12/2003 | Wampler |
| 2004/0041800 | A1 | 3/2004 | Daniels |
| 2004/0073764 | A1* | 4/2004 | Andreasson ........ G06F 12/0253 |
| | | | 711/170 |
| 2004/0155833 | A1 | 8/2004 | Ishii |
| 2004/0193819 | A1* | 9/2004 | Marinescu .......... G06F 12/0253 |
| | | | 711/165 |
| 2004/0198438 | A1 | 10/2004 | Song |
| 2004/0217877 | A1 | 11/2004 | Kokonaski |
| 2004/0230794 | A1* | 11/2004 | England .............. G06F 9/45537 |
| | | | 713/164 |
| 2005/0044301 | A1* | 2/2005 | Vasilevsky .......... G06F 9/45533 |
| | | | 711/1 |
| 2005/0050071 | A1* | 3/2005 | Debrunner ........ G06F 17/30575 |
| 2005/0160423 | A1 | 7/2005 | Bantz |
| 2005/0240641 | A1* | 10/2005 | Kimura ............... G06F 12/0253 |
| 2005/0246718 | A1* | 11/2005 | Erlingsson ............ G06F 9/4411 |
| | | | 719/317 |
| 2006/0085785 | A1 | 4/2006 | Garrett |
| 2006/0143350 | A1 | 6/2006 | Miloushev |
| 2006/0265710 | A1 | 11/2006 | Ansari |
| 2006/0271395 | A1* | 11/2006 | Harris ....................... G06F 9/52 |
| | | | 718/1 |
| 2006/0271827 | A1* | 11/2006 | Cascaval ............. G06F 11/3466 |
| | | | 714/39 |
| 2007/0180450 | A1 | 8/2007 | Croft |
| 2007/0226736 | A1* | 9/2007 | Johnson .............. G06F 9/45533 |
| | | | 718/1 |
| 2007/0247422 | A1 | 10/2007 | Vertegaal |
| 2008/0005488 | A1 | 1/2008 | Watkins |

OTHER PUBLICATIONS

Huang, et al., A Case for High Performance Computing with Virtual Machines, Jun. 2006, pp. 125-134.
Fraser, et al., The Xenoserver Computing Infrastructure, 2003, pp. 1-8.
Ravi, et al., Portable Smart Message for Ubiquitous Java-Enabled Devices, 2004, 10 pages.
Huai, et al., Civic: A Hypervisor Based Virtual Computing Environment, 2007, 7 pages.
Unknown Author, VmWare ESX Server: Platform for Virtualizing Servers, Storage and Networking, Product Sheet, Retrieved from Wayback Machine, Apr. 20, 2007, 4 pages.
Unknown Author, Data Synapse, GridServer Architecture, Jun. 23, 2006, 2 pages. Retrieved from: w.datasynapse.com/solutions/arch.html.
Cassatt, Cassatt Collage: Service Level Automation Platform, 2006, 2 pages.
Unknown Author, Enigmatec Execution Management Intelligent Automation, 2005, 2 pages.
International Searching Authority, International Search Report and Written Opinion for PCT International Application No. PCT/US2007/075407, dated Oct. 9, 2008, 10 pages.
European Patent Office, European Search Report for EP07840749.1, dated Jun. 4, 2012, 11 pages.
European Patent Office, European Search Report for EP12162445.6, dated Jul. 7, 2012, 8 pages.
State Intellectual Property Office of the People's Republic of China, 1st Office Action for Chinese Patent Application No. 200780033514.5, dated Aug. 2, 2011, 6 pages.
State Intellectual Property Office of the People's Republic of China, 2nd Office Action for Chinese Patent Application No. 200780033514.5, dated Jun. 20, 2012, 5 pages.
State Intellectual Property Office of the People's Republic of China, 3rd Office Action for Chinese Patent Application No. 200780033514.5, dated Jan. 18, 2013, 4 pages.
State Intellectual Property Office of the People's Republic of China, Search Report from Office Action dated Feb. 23, 2016 for Chinese Patent Application No. 201310505477.0, 2 pages.

* cited by examiner

SYSTEM AND METHOD FOR PROVIDING HARDWARE VIRTUALIZATION IN A VIRTUAL MACHINE ENVIRONMENT

CLAIM OF PRIORITY

This application is a continuation of U.S. patent application titled "SYSTEM AND METHOD FOR PROVIDING HARDWARE VIRTUALIZATION IN A VIRTUAL MACHINE ENVIRONMENT", application Ser. No. 13/551,412, filed Jul. 17, 2012; which is a continuation of U.S. patent application titled "SYSTEM AND METHOD FOR PROVIDING HARDWARE VIRTUALIZATION IN A VIRTUAL MACHINE ENVIRONMENT", application Ser. No. 11/835,307, filed Aug. 7, 2007; which claims the benefit of priority to U.S. Provisional Patent Application titled "SYSTEM AND METHOD FOR PROVIDING HARDWARE VIRTUALIZATION IN A VIRTUAL MACHINE ENVIRONMENT", Application No. 60/821,673, filed Aug. 7, 2006, each of which above applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to operating systems, application servers, and virtual machines, and more particularly to a system and method for providing hardware virtualization and resource management in a virtual machine environment.

BACKGROUND

Many of today's mission-critical business applications are developed and deployed on Java-based application servers, (including, for example, application servers that are compliant with the Java 2 Enterprise Edition or J2EE specification). These applications have traditionally been deployed on single-vendor RISC computers and servers, and other expensive hardware platforms. The readily available and lower-cost PC-based servers had not been considered a suitable alternative because of the absence of a competitive, high performing Java Virtual Machine (JVM) that could be used with these architectures. The latest virtual machine environments, such as the JRockit product from BEA Systems, Inc., tackle this problem in that these virtual machines can be optimized for use in a variety of environments, including PC-based ones, enabling Java applications to run with increased reliability and performance on lower cost, standards-based platforms. The JRockit virtual machine is an example of a virtual machine that is particularly well-designed to power demanding server-side Java applications, delivering superior performance, manageability, and reliability. However, while current virtual machine product offerings are adept at providing software virtualization, little has been done to date to support virtualization at the underlying hardware or operating system level, or to manage resources at the virtual machine level, while still allowing the application server to control or to participate in the virtualization process.

SUMMARY

Disclosed herein is a system and method for providing hardware virtualization and resource management in a virtual machine environment. In accordance with an embodiment, an application server environment that includes a computer system, application server, and virtual machine (for example, a Java Virtual Machine or JVM) is extended to provide an interface from the higher layers in the application server environment to the system's actual processing power, such that the allocation of processing can be made in a machine-independent way. A layer of software is placed between the virtual machine and the hardware that improves the efficiency of the virtualized Java execution system. In accordance with an embodiment, the system comprises two main components: a first, lower-level, execution environment that replaces the usual operating system; and a second, higher-level, resource broker that is responsible for handing out new virtual machines to the above layers, and for monitoring the current resource usage of the running virtual machines. In this way, the underlying physical machine can be partitioned to support multiple JVM's. Additionally, goals can be set within the system as to CPU and other resource allocation, and the system can allocate the JVMs appropriately.

DETAILED DESCRIPTION

Disclosed herein is a system and method for providing hardware virtualization and resource management In a virtual machine environment. In accordance with an embodiment, an application server environment that includes a computer system, application server, and virtual machine (for example, a Java Virtual Machine or JVM) is extended to provide an interface from the higher layers in the application server environment to the system's actual processing power, such that the allocation of processing can be made in a machine-independent way. A layer of software is placed between the virtual machine and the hardware that improves the efficiency of the virtualized Java execution system. In accordance with an embodiment, the system comprises two main components: a first, lower-level, execution environment that replaces the usual operating system; and a second, higher-level, resource broker that is responsible for handing out new virtual machines to the above layers, and for monitoring the current resource usage of the running virtual machines. In this way, the underlying physical machine can be partitioned to support multiple JVM's. Additionally, goals can be set within the system as to CPU and other resource allocation, and the system can allocate the JVMs appropriately.

Glossary

The following terms are used herein.

Domain: An operating system instance running on top of a hypervisor layer. Multiple domains can run on the same machine unaware of each other. A domain may also be referred to herein as a Guest OS, Guest, or VM.

Domain 0: The first domain in the hypervisor layer, also referred to herein as a control domain. In some implementation the control domain has more privileges and controls the other domains.

Bare Metal Domain: A domain running a virtualization layer, virtual machine, and an application in accordance with an embodiment of the invention. (For example, in one embodiment the bare metal domain comprises the bare metal os layer plus the JRockit JVM plus an application). A bare metal domain may also be referred to herein as a BM Domain.

Initiating Domain: a domain that runs an ordinary operating system that is responsible for invoking a bare metal domain, and that is also responsible for executing any native code of the BM Domain.

Node: A physical machine or a physical computer in the network.

Grid Computing: A set of multiple nodes working together to solve a single computational problem.

Utility Computing: A system or environment which allows many applications to be run efficiently over many physical machines. The utility computing environment allows high-level policies to be specified on the applications to help the system decide which particular applications to prioritize. The utility computing environment also allows a user to deploy new applications to the system; provide high-level policies and/or guarantees for each application; monitor the status the applications and the machines; handle rapid increases in resource utilization for a specific application; provision system upgrades; and provide high availability.

Figure 1:
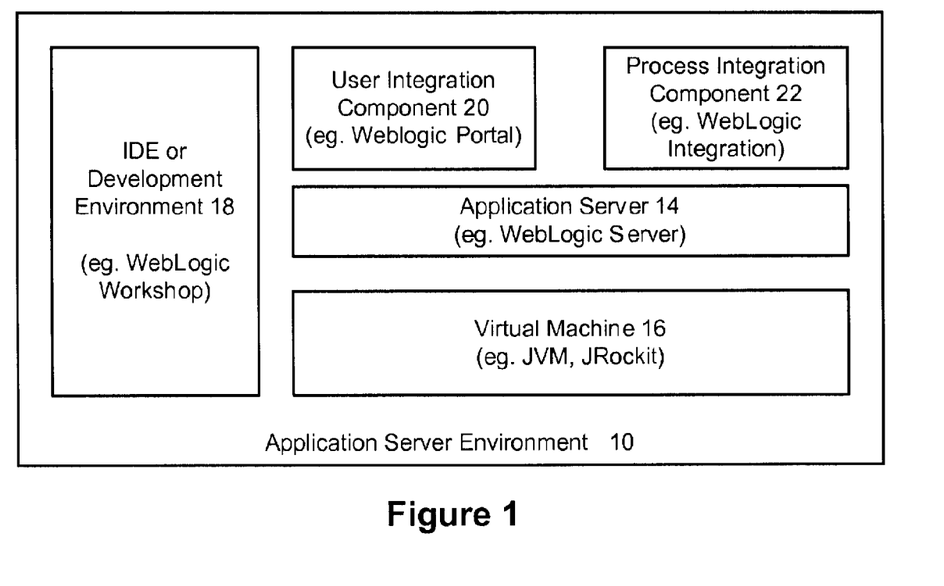
FIG. 1 shows an illustration of an application server environment that includes a virtual machine in accordance with an embodiment of the invention.

FIG. 1 shows an illustration of an application server environment that includes a virtual machine, and which can be used with an embodiment of the invention. As shown in FIG. 1, the application server environment 10 includes an application server 14, (for example, the WebLogic server product developed by BEA Systems, Inc., or another type of application server), together with a virtual machine 16, (for example, the JRockit JVM also developed by BEA Systems, Inc., or another type of virtual machine). FIG. 1 also illustrates optional components that are often used in an application server environment, for example a development environment 18, user integration component 20, or process integration component 22. Examples of these latter optional components include the WebLogic Workshop, WebLogic Portal, and WebLogic Integration products respectively, each of which are also developed by BEA Systems, Inc. Additional components can be added to the environment as necessary.

Figure 2:
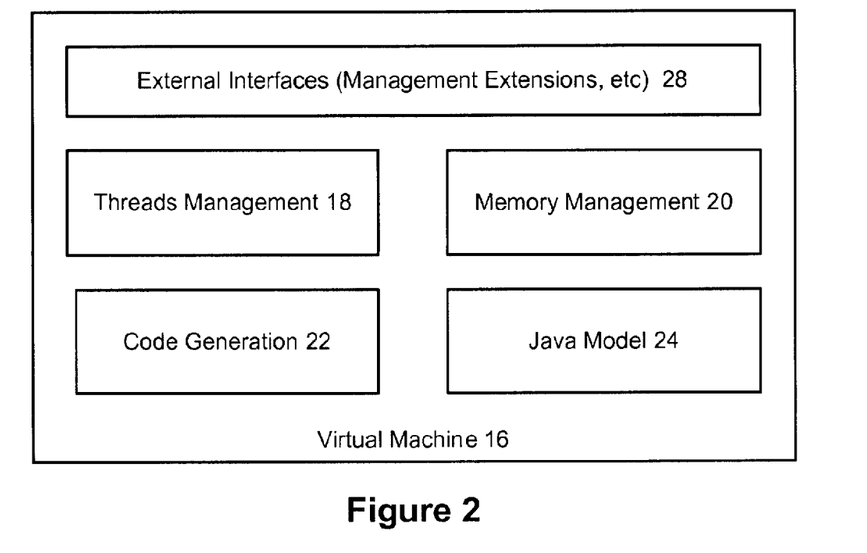
FIG. 2 shows an illustration of a layered virtual machine architecture in accordance with an embodiment of the invention.

FIG. 2 shows a more detailed illustration of a virtual machine architecture in accordance with an embodiment. As shown in FIG. 2, a typical virtual machine 16, such as the JRockit JVM, comprises a threads management component 18 to manage the running threads in the system; a memory management component 20 to take care of procedures such as garbage collection; a code generation component 22; and a Java model component 24. A typical virtual machine also provides external interfaces 28 for use in managing the virtual machine. Although FIG. 2 represents the JRockit product, it will be evident that other virtual machines in addition to the JRockit implementation can be used within the spirit and scope of the invention.

To enable efficient application virtualization, a correspondingly efficient hardware resource virtualization is required. This makes it possible to provide functionality such as suspension, live provisioning, and live migration. In accordance with an embodiment of the invention, an extra layer of abstraction is added. This enables the virtual machine to be moved relatively closer to the underlying hardware.

Figure 3:
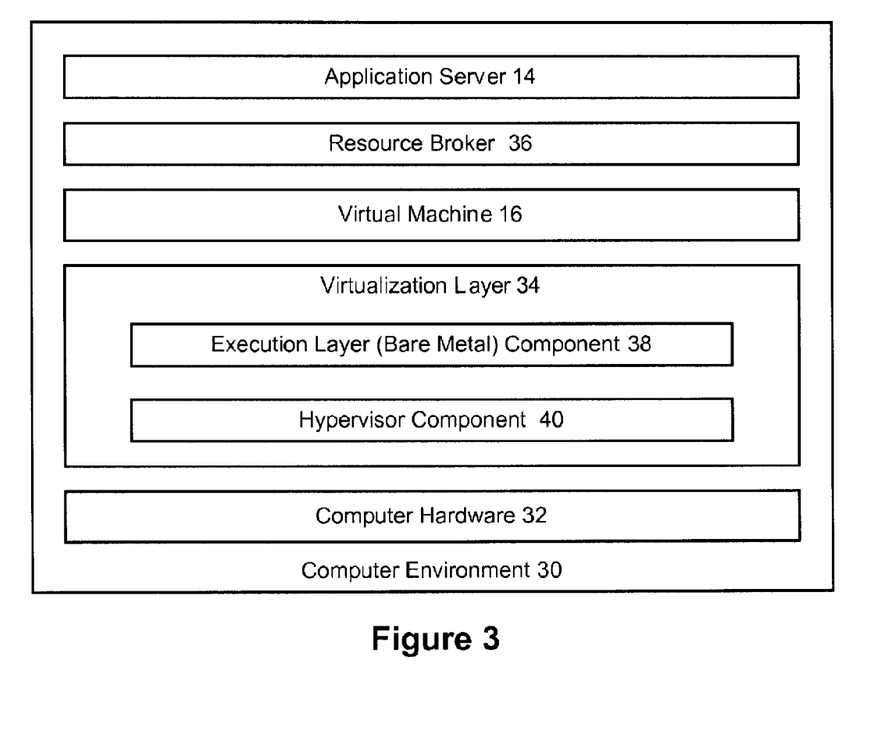
FIG. 3 shows an illustration of a multiple layered domain environment in accordance with an embodiment of the invention.

FIG. 3 shows an illustration of a multiple layered domain environment in accordance with an embodiment of the invention. As shown in FIG. 3, the computing environment 30 comprises a physical computer hardware or a computer machine 32. The machine can be a physical server, computer machine, network device, or an equivalent type of computing or processing device. The computing environment includes a virtualization layer 34 that sits logically on top of the processing device in the place of the typical operating system. In accordance with an embodiment, the virtualization layer comprises an execution layer component 38 (also referred to herein as the "bare metal layer"), and a hypervisor layer component 40 or hypervisor layer. Examples of currently available hypervisor layer components include the Xen hypervisor, and the VMWare hypervisor. Other hypervisor layers and hypervisor layer components can be used in accordance with other embodiments.

The hypervisor layer is inserted between the server's hardware and the operating system. This provides an abstraction layer that allows each physical server to run one or more virtual servers, and effectively decouples the operating system and its applications from the underlying physical server. Once a virtual server image has been created it can then be run on any server. On the same principle, multiple virtual servers can simultaneously share a single physical server or machine. The net effect is to increase the overall server utilization, while at the same time receiving a resource guarantee that ensures that any particular application layer performance criteria is met.

As further illustrated in FIG. 3, the virtual machine 16 is logically located above the virtualization layer. A resource broker 36, or a set of resource broker services, is then provided at a layer above the virtual machine. The resource broker is used by the application server 14, and by other applications, to use the services provided by the virtualization layer.

In some embodiments, the above-described system can then be used as part of an overall utility computing environment, by providing a hardware virtualization service for Java applications within a local network. When used in the context of a utility computing environment, services can be provided that allow a networked application to interface with the virtual machine. In a utility computing or multiple virtual machine environment, examples of services that can be provided include: the ability to create a new virtual machine or JVM somewhere in the networked environment; resource guarantees, such as minimum and maximum CPU, memory, or network bandwidth usages; resource metering and system thermostat functions; the ability to dynamically increase or decrease resources when an application needs more or less of those resources; features such as suspend to disk or resume from disk a running application (referred to herein as "freeze-dry"); the ability to clone a "freeze-dried" application (similar to a Unix fork-like functionality, i.e. instantiate the cloned application with new instance specific values); and the ability to move a running instance to another computer machine for planned system maintenance.

Figure 4:
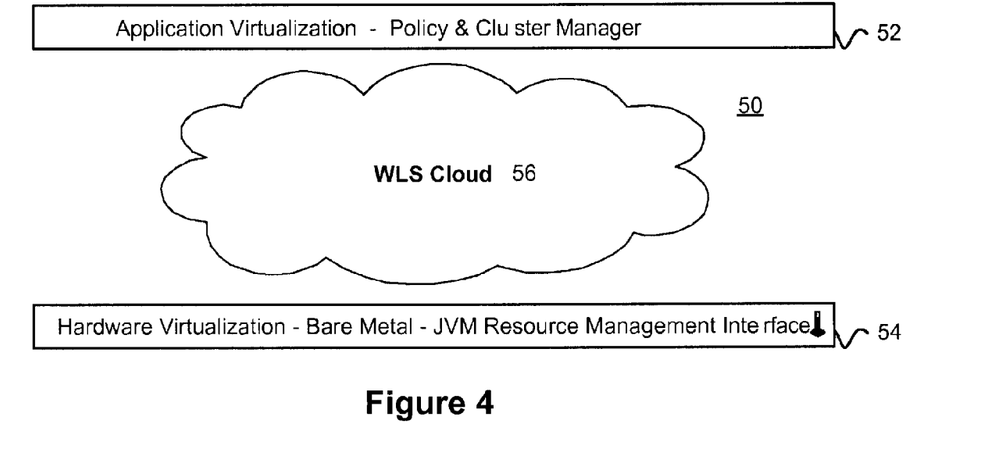
FIG. 4 shows an illustration of how an embodiment of the virtualization layer can be used in a utility computing environment in accordance with an embodiment of the invention.

FIG. 4 shows an illustration of how an embodiment of the virtualization layer can be used in a utility computing environment 50. As shown in FIG. 4, applications can use application virtualization features 52, including for example the resource broker services or utility computing services described above, to access the underlying hardware virtualization layers 54 via an application server cloud 56. In accordance with an embodiment, the application server cloud can be a WebLogic server environment, which may in turn provide other advanced server features such as enterprise clustering.

Figure 5:
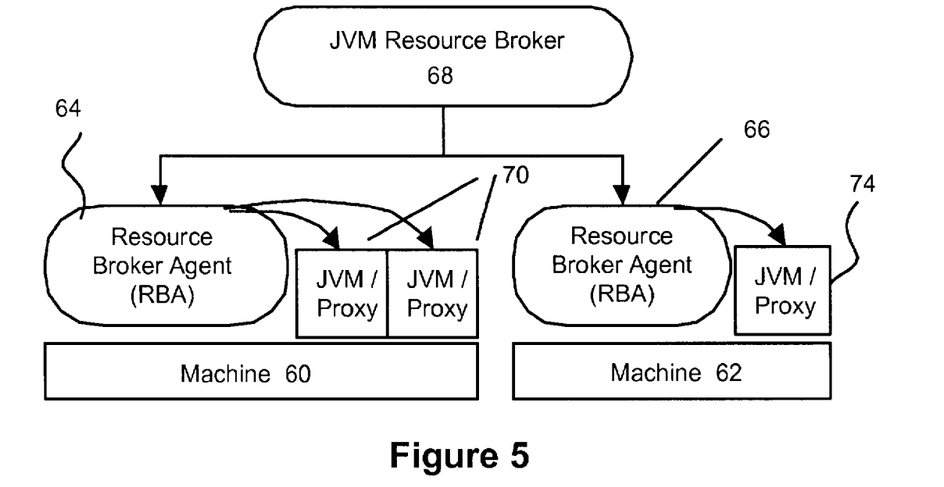
FIG. 5 shows an illustration of bare metal domains together with resource brokers in accordance with an embodiment of the invention.

FIG. 5 shows an illustration of bare metal domains together with resource brokers in accordance with an embodiment of the invention. In accordance with an embodiment, the resource broker provides subservices to the application server and to the other software applications running thereon. These subservices can include for example: obtain a new JVM; provision the JVMs running on the server; meter the resources of a particular JVM; and control the resources of a JVM. The main component for JVM creation is the resource broker 68 (as described above) which in this instance tracks which of the machines 60, 62 are available to create new virtualization layer instances on. In accordance with an embodiment, a resource broker agent (RBA) 64, 66 is located on each machine. The resource broker agent is responsible for the local creation of the JVM instance 70, 72, 74, i.e. for creation and management of JVM's operating on the same physical machine as the agent. All outside communication, from a first machine to a second machine, or throughout a cluster, travels first through the resource broker, which then directs the request to the responding resource broker agent. In this manner, the resource broker acts like a pool of agents, and keeps track of which particular agent controls which particular machine that in turn has the necessary available power to fulfill a request from an application.

In accordance with an embodiment, the resource broker is a general hardware abstraction layer. It can potentially be used with a large number of different machine types. If the machine type supports partitioning, then the resource broker can use that functionality to partition the machine as needed. Depending on which features a certain machine type supports, different pieces of the high-end functionality can then be made available. At a minimum the functionality should allow new JVMs to be created on the machine with approximate resource usage targets (for example at least limited guarantees, limited sharing, no suspension and no migration).

It should be noted that the resource broker does not itself require the execution layer (i.e. the bare metal layer) for it to perform many of its operations, although when the resource broker is combined with the execution layer then the system will run better, and will support a greater range of features.

It should be noted that normal, i.e. non-virtualized machines can also be added to the resource broker, even though functionality may be reduced in these instances. In accordance with other embodiments, the resource broker can also include support for third-party systems such as Azul, Solaris Containers and other hypervisor-stacks. In accordance with an embodiment, Xen domains and VMWare guests are also able to support native bare metal resource guarantees, resource sharing, suspension, migration, hot-pluggability, and virtualized file systems.

In accordance with an embodiment, the resource broker service is fault tolerant. To achieve this, each resource broker agent includes its own copy of the resource broker service. An algorithm is then used to select a leader resource broker agent that will act as the resource broker service. In case of failure a new election process is started. When contact is lost with the some nodes in the cluster, the nodes that still have the original leader will continue to operate as normal (except that the machines that are no longer reachable will be removed from the cluster). The other nodes will elect a new leader but are no longer allowed to create new instances. One potential problem can be that of duplicate IP-addresses—when the network is restored, it is not possible to have two machines with the same IP address, so appropriate precautions must be taken to avoid this. In one implementation each individual agent owns a range of IP-addresses and the leader can request a set of IP-addresses each time. This allows each isolated group of machines to continue to create new virtual machines even when connectivity with the original leader is lost.

JVM Proxy

Figure 6:
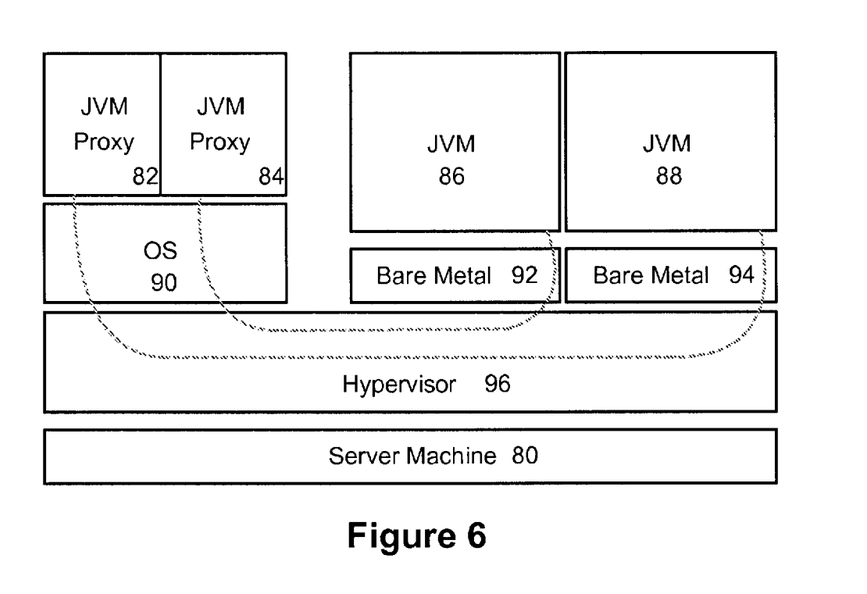
FIG. 6 shows an illustration of bare metal domains together with JVM proxies in accordance with an embodiment of the invention.

FIG. 6 shows an illustration of bare metal domains together with JVM proxies in accordance with an embodiment of the invention. As described above, in some embodiments the execution layer or bare metal layer, and the underlying hypervisor are not a necessity for the above layers. In accordance with some embodiments the resource broker services can act as a stand-alone entity. However, in these instances one will not obtain the same resource sharing and the same resource guarantees as offered by the combination of all of the elements. As shown in FIG. 6, a physical server machine 80 can have many JVM's running thereon. In some instances JNI code execution and real device driver access are handled by the normal operating system (OS) 90. When it is run on top of a hypervisor layer 96, the execution layer 92, 94 is built to then optimize the execution of any JVMs 86, 88 operating thereon. In particular the hypervisor layer/execution layer combination supports isolation and copy-on-write sharing of data to reduce the footprint of the multiple JVMs running on the same physical machine. A JVM proxy 82, 82 above the OS layer is provided to allow functions and services in the execution layer to be invoked via the OS.

In some embodiments, CPU's and processors can include built-in support for virtualization (for example, some Intel VT, and AMD Pacifica processors). In these embodiments, the system allows for uncooperative virtualization (i.e. the original OS need not be built to support virtualization for multiple VMs to run on the same box). This in turn allow for example Bare Metal running on Xen to coexist with Windows on the same physical machine.

Performance Monitoring Framework

In accordance with an embodiment, the virtualization layer is responsible for: performance monitoring, including for example setting up the hardware performance counters so that these can be used for efficient performance monitoring; counting idle CPU cycles to be able to provide CPU-utilization; Counting thread-switches to provide thread-switches per second counts; Counting I/O operations to provide ops/second counts; and Counting page-faults/second.

Power Units and CPU Share

As described above, one of the useful features of the system is its ability to allocate available resources to respond to application requests. In accordance with an embodiment, PowerUnits is an approximation of how many Java operations the current JVM instance is performing, or is guaranteed to have. This information is then used to allocate JVM resources over the available machines or other physical hardware. In accordance with an embodiment, all units of measurements are considered estimates. The measurements are then used as relative measurements (i.e. 200 PowerUnits will be roughly twice as much computing power as 100 PowerUnits). It should also always be true that the number of units one physical machine says it can produce should be exactly the sum of all of the virtual machines current usage plus the idle units. On a particular machine the relative measurements are likely to work better, and to make more sense, than if considered across several different machines. In particular the more different two machines are the less exact the relative measurements will likely be. The goal is typically that the PowerUnits should be comparable to the furthest extent possible between different machines.

System Interfaces and Functions

Table 1 lists some of the interfaces and functionality that are provided by the system in accordance with one embodiment. The functions allow a high-level application to create JVMs and allocate resources over several machines, including within a cluster. It will be evident that in other embodiments, additional interfaces and functions can be provided.

TABLE 1

| Request: | Response: |
|---|---|
| Creation Interface | |
| Give me a new JVM that follows this resource specification; and assign this instance a machine, but don't start it yet. | JVM-Handle. |
| Give me a new JVM; assign this instance a machine; use the specified image to initiate the instance; but don't start the instance yet. | JVM-Handle. |
| Remove this JVM. | OK/Fail. |
| Initiation Interface | |
| Mount the directory labeled X in your view; and mount it in (read-only, read-writable, exclusive)-mode. | OK/Fail. |
| Set the command-line to start with. | OK/Fail. |
| Start the JVM. | OK/Fail. |
| Suspend/Resume Interface | |
| Suspend this running JVM. | OK/Fail. |
| Store a suspend JVM image to a specified location; the image can then be used in a later call to create a new JVM. | OK/Fail. |
| Resume; resume a previously suspended JVM; any active network connections will be disconnected. | OK/Fail. |
| Resource Interface | |
| Report how much resources you are using. | Resources in use. |
| Request a change (increase or decrease) in available resources. | OK/Fail. |

In accordance with an embodiment, the system can request and measure any or all of four types of resources, which it can then use to allocate resources over the appropriate JVMs. These include: a PowerUnits measurement (as described above); Java Heap Memory; Network Bandwidth; and Disk I/O. Additional embodiments can provide additional types of resource measurement options.

When requesting Power Units, the above layers can set a minimum (i.e. what must be guaranteed to be available) and a weight. For the other three resource types only a minimum can be specified. Potentially overcapacity is provided on a first-come first-served basis as guided by the weights. This design choice simplifies the optimization space fundamentally, and makes placement of servers simpler. The underlying reason for this approach is because most applications tend to be processing or memory bound (i.e. memory bound as in waiting for a load, not as in needing more memory).

In accordance with an embodiment the memory heap is designed expand on demand to the needs of the application, so a maximum heap size should not generally be specified. An OutOfMemory error is thrown only when the system has run out of address space (which is completely unfixable) or run out of physical memory (which may be resolved by moving to a box with more memory, moving a VMS on the same machine to another machine, or by reducing the memory in use by other VMS).

Virtualized File System

Since the higher-level layer does not know what is installed on the machine that the JVM will actually be located on, some embodiments include an abstraction to make sure that the right files are in place locally on the machine. This can be implemented by making the file system as seen from inside the JVM completely virtualized. This means that a location within the virtual file system can be physically located somewhere completely different on the real machine.

In accordance with an embodiment, the file system uses Unix-like path conventions. External directories can be mounted into this virtual file system. Depending on how the directories have been mounted different effects are achieved (for example, mounted external read-only, external read-writable, or local copy). Within the virtual filesystem there is a standard directory structure:

/—root itself is only listable
/usr/java—contains the current jdk installation. There can only be one jdk installation in a single bare metal instance. Only the bare metal layer itself can mount into /usr.
/proc—a linux-like /proc file-tree that can be used to get information about the running instance of bare metal. Only bare metal itself layer can mount into /proc.
/opt/—the location where the Java applications themselves should be mounted.

Machine Resource Broker Service

In accordance with an embodiment, a machine resource broker (MRB) service or interface is provided as the primary interface from below, i.e. from the machine hardware layer. This service is used to bind new machines that have been added to the network into the application server cloud, and for an administrator to see which JVM-instances are running on which physical machines and what the status is of each box. In accordance with an embodiment this service interface operates with standard management tools, in addition to standard hardware virtualization tools. In some embodiments, a means is also provided for an external resource manager/broker to request the resource broker to relinquish a set of machines, or to remove a specified machine from the resource broker cluster.

In accordance with an embodiment, if a machine is configured to perform a network boot, then the MRB will provide it's initial boot image. The initial boot image will include an hypervisor + a control domain + a Machine Controller (MC). The machine controller will be put in an inactive state. There are three modes of operation: all added machines are immediately available for use; all added machines are immediately provisioned but put in an inactive state; or only machines specified in the RB are provisioned all other machines are ignored.

Benefits of Using a Hypervisor

The benefits of using a hypervisor include that, typically, hypervisors are good at isolation, whereas operating system (OS) processes are not as good. Especially requirements on a minimum amount of CPU are hard to guarantee at the process level. Features such as Suspend and Resume Saving the complete state of the system is also difficult at any layer above the OS layer. The problem is that this is the only layer that has complete information of the state of the system (e.g. the JVM may be able to keep track of open files, mapped memory, threads in native code etc, but it is impossible for the JVM to completely restore the state upon Resume). The Live Migration feature is simpler: since the hypervisor abstracts away the hardware the system has the ability to migrate a running system to another box. By cooperation between the JVM-layer, across the OS-layer, to the hypervisor-layer this can be performed more efficiently. Using the hypervisor can also ensures that, for example, a certain amount of CPU time can be made available to the system, and that the system can meter how much CPU time each container is using.

Benefits of Using a Special OS Layer

In some embodiments, a special operating system (OS) layer is used. Memory sharing can be performed at many levels (application, app. server, JVM, OS). But some types of sharing are more efficiently performed at certain layers of the stack. In particular, the combination of the support from the combination of the JVM and the hypervisor allows the system to share memory between different JVMs in an inverse-fork-like manner. This means that the system can "after the fact" tell the hypervisor that certain pages are identical between different JVMs. The hypervisor can then let these pages be mapped to the same physical pages with a copy-on-write strategy. In addition, a special OS-layer enables some functionality that was previously not possible, for example: the OS will only handle one process the JVM process that runs the application; and the OS understands the JVM and there is smart cooperation/communication between the JVM and the OS that enables powerful optimizations. Some features are impossible without OS-level support, for example: pauseless compaction by disabling some pages for mutator threads while the garbage collector is compacting in those areas; smart thread scheduling that for example instead of spinning on a lock schedules the thread that is holding that lock. The special OS layer also creates some efficiencies through OS-layer removal. Removing the OS-layer leads to lower pause times, better behavior during high contention and low memory. Adding a hypervisor adds an extra level of abstraction which also quite naturally slows down the system. By removing the operating system the system can compensate for this slowdown and perhaps even improve over it. By using a hypervisor and having an ordinary operating system installed as one of the guest OSes, Bare Metal can avoid writing device drivers for different devices and just one simple one that talks through the hypervisor to the device drivers on the guest OS with the operating system.

System Design

In accordance with an embodiment, the Resource Management Service includes a Java interface as its main interface. Users of the interface can include application servers, applications, and enterprise-wide applications, for example clustering applications. The actual Java APIs for one embodiment are illustrated below as Appendix A.

Figure 7:
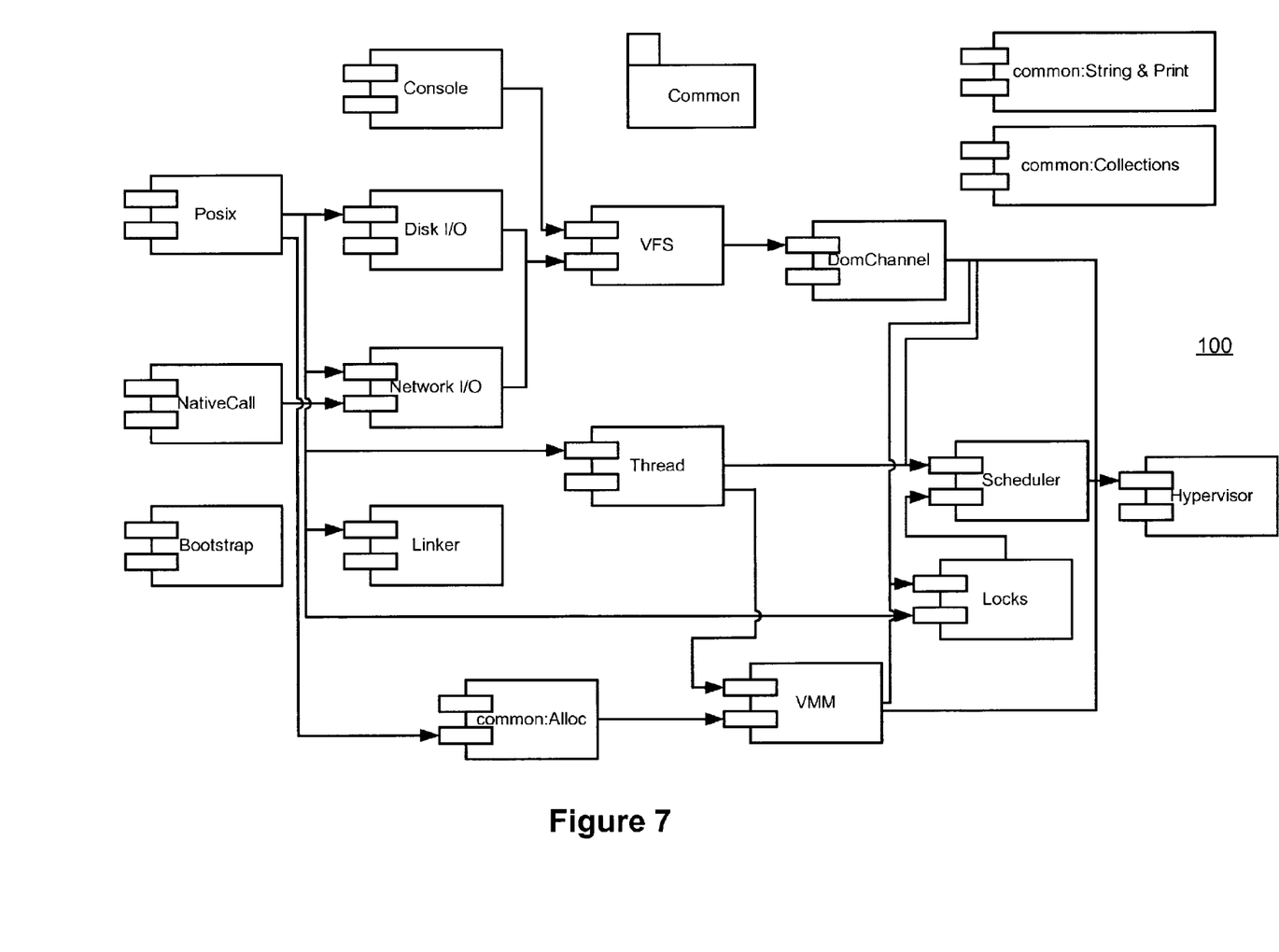
FIG. 7 shows a logical diagram of the virtual machine environment components in accordance with an embodiment of the invention.

FIG. 7 shows a logical diagram 100 of the virtual machine environment components in accordance with an embodiment of the invention. The virtualization layer should ideally be as small as possible. As shown in FIG. 7, this reduces essentially to a thin layer of hypervisor (for example, Xen or VMWare, or another hypervisor), a thin layer of operating environment (for example, the bare metal execution layer), and a fatter blob of execution engine (for example, JRockit or another JVM), all running a very fat application (for example, WebLogic Server plus customer applications). In some embodiments, it is assumed that the OS layer is built assuming a para-virtualized hypervisor (i.e. there is cooperation between the OS and the hypervisor, the OS is hypervisor-aware); however other embodiments may use cooperative OS and hypervisors.

Figure 8:
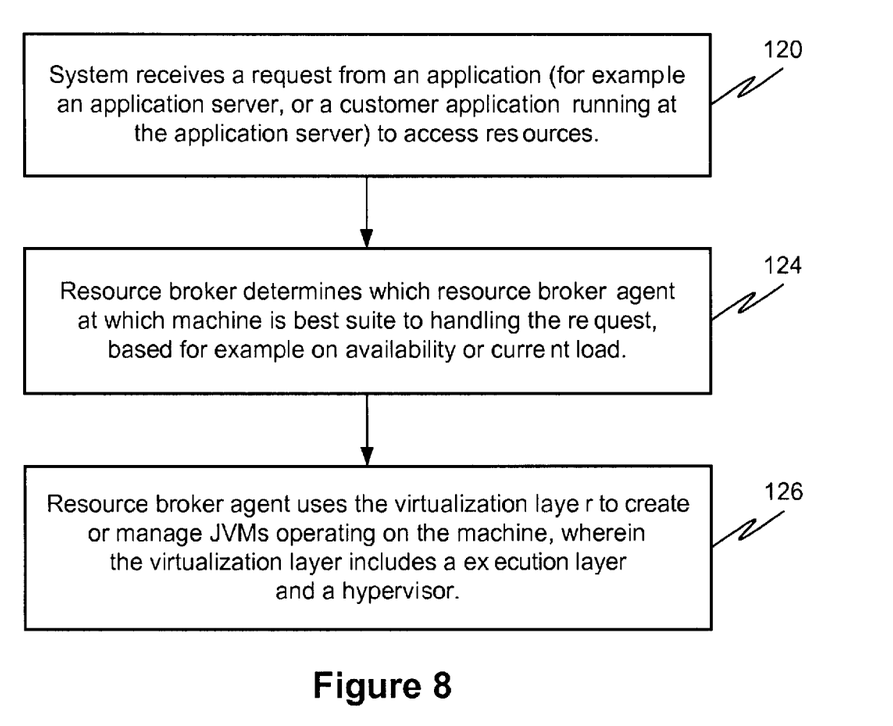
FIG. 8 shows a flowchart of a method for using virtualization in accordance with an embodiment of the invention.

FIG. 8 shows a flowchart of a method for using virtualization in accordance with an embodiment of the invention. As shown in FIG. 8, in step 120, the system receives a request from an application (for example an application server, or a customer application running at the application server) to access resources, which must be provided by a JVM. In step 122, the resource broker determines which resource broker agent at which machine is best suite to handling the request, based for example on availability or current load. In step 124 the resource broker agent uses the virtualization layer to create or manage JVMs operating on the machine, wherein the virtualization layer includes a execution layer and a hypervisor.

APPENDIX A

The following code defines an actual Java API for use with an embodiment of the current invention. It will be evident that other API's may be defined in other embodiments within the spirit and scope of the invention.

```
Resource Broker API
package com.bea.jvmbroker;
public interface JVMBroker
{
    /**
     * Create a new JVM instance. The JVM instance is bound to a
     * specific machine and has a UUID and can be populated hereafter.
     * The JVM is not using any resource yet though
     */
    public JVM createJVM(JVMRequest rc);
    /**
     * Create a new JVM instance.
     * @note This is a convenience method see createJVM for more information.
     */
    public JVM createJVM( );
    /**
     * Create a new JVM instance from an image. The image is a previosuly
     * suspended JVM. When started the JVM will be started in a suspended
     * state and a call to resume( ) will be required to resume execution.
     *
     * @note This is a convenience method see createJVM for more information.
     */
    public JVM createJVMFromImage(JVMRequest rc, File image);
}
/**
 * This interface represents a JVM handle from the JVM Resource Brokers
 * perspective.
 *
 * This is the interface used to configure a JVM. At the point you have
 * one of these the JVM is bound to a machine, but it may not be started
 * yet.
 */
public interface JVM
{
    /**
     * Get the IP addresses of the JVM. This is typically one IP address.
     *
     */
    public InetAddress[ ] getAddresses( );
    /**
     * Set the startup command to the JVM.
     *
     * @param name - the name of the main class to start
```

APPENDIX A-continued

The following code defines an actual Java API for use with an embodiment of the current invention. It will be evident that other API's may be defined in other embodiments within the spirit and scope of the invention.

```
 * @param args - the arguments passed to the main method of the main class
 */
public void setStartCommand(String name, String[ ] args) throws IllegalStateException;
/**
 * Mount the predefined mount point called path. Path must be a valid
 * predefined mount point on the machine in question. Path is a UNIX-like
 * path.
 *
 * i.e. mount("/wls") or mount("/wls90");
 */
public void mount(String path);
/**
 * Start the JVM. This method can only be called once.
 */
public void start( ) throws IllegalStateException;
/**
 * Suspends a running JVM.
 */
public void suspend( );
/**
 * Resumes the execution of a suspended JVM.
 */
public void resume( );
/**
 * Called to increase or decrease the agreed upon resource
 * usage for this JVM
 */
public boolean changeRequirements(JVMRequirements rc);
/**
 * Get an estimate of the current resource usage.
 *
 * This info can be used to make clustering decisions at
 * a higher level.
 *
 * e.g. if you are using equal or more
 * power units than you requested, this application is
 * probably power-unit-limited (similar to CPU/memory bound)
 * so it makes sense to request more PUs locally if possible.
 *
 * Alternatively, if the application is NOT using all it's power
 * units the bottleneck is probably elsewhere and requesting more
 * power or starting more instances will not help.
 */
public JVMResources getResourceUsage( );
/**
 * Get the physical machine this JVM is placed on. Physical here
 * means what the Resource Broker thinks is a physical machine.
 * Some other layer may of course have fooled us into believing
 * that a virtual machine is a physical machine ;-)
 */
public Machine getMachine( );
/**
 * Will save the suspended image to the specified file (the file
 * is specified as a local path from the caller of storeImage.)
 * If the JVM is on another machine than the caller, this operation
 * may take numerous seconds to complete as the data will have to
 * be moved from that server to the caller (or whatever fileserver
 * the caller is referring to)
 *
 * This method can only be called when the JVM is suspended.
 */
public void storeImage(File f) throws IllegalStateException;
/**
 * Register a listener that is interested in JVM events
 */
public void registerListener(JVMListener jl);
}
/**
```

APPENDIX A-continued

The following code defines an actual Java API for use with an embodiment of the current invention. It will be evident that other API's may be defined in other embodiments within the spirit and scope of the invention.

```
* This is the interface for specifying lan-wide requirements on a JVM before
* it is started both in terms of how much resources it may uses, as well
* as more global requirements such as where it may be located in relation
* to other JVMs
*
* For the JVM Local requirements also see JVMRequirements.
*
* @see com.bea.jvmbroker.JVMRequirements
* @author Joakim Dahlstedt (joakim.dahlstedt@bea.com)
*/
public interface JVMRequest {
    /**
     * Get the JVM resource requirements
     */
    public abstract JVMRequirements getJVMRequirements( );
    /**
     * Set the JVM resource requirements for this JVM
     */
    public abstract void setJVMRequirements(JVMRequirements r);
    /**
     * Get the group of JVMs this JVM should belong to. A group is normally used
     * to inform the resource broker that this set of JVMs serve the same
application
     */
    public abstract JVMGroup getJVMGroup( );
    /**
     * Set the group of JVMs this JVM should belong to. A group is normally used
     * to inform the resource broker that this set of JVMs serve the same
application
     */
    public abstract void getJVMGroup(JVMGroup jg);
    /**
     *  Get the specific machine this JVM must run on
     */
    public abstract Machine getMachine( );
    /**
     * Require this JVM to run on a specific machine.
     *
     * This is not recommended behavior. It will strongly limit the
     * resource brokers abilities to schedule resource to take full
     * advangtage of the machines.
     *
     * Cases where setMachine may be used: when a special machine is the only
     * one that can access a certain service (say it's the only one that has
     * the connection to the CICS system or to a REUTERS terminal).
     *
     * @note this is not supported functionality in the pilot
     * @note the idea is to support this in v1.0
     */
    public abstract void setMachine(Machine m);
    /**
     * Get the auto start value
     */
    public abstract int getAutoRestart( );
    /**
     * Specify whether to restart if the JVM shutsdown with a non-zero exit code
     *
     * The number specifies how many times to trying restart before giving up.
     *
     * 0 = no auto restart (default)
     */
    public abstract void setAutoRestart(int ntimes);
}
/**
* This class represent local resource constraints on a JVM. Local in this case
* local to the JVM itself, if you want to put requirements on the dependency
* between different JVMs or want a certain JVM to execute on a certain machine
* or something like that, you should look at JVMRequest.
*
* @see com.bea.jvmbroker.JVMRequest
*/
public class JVMRequirements {
    private static final int DEFAULT_WEIGHT = 100;
    private static final long MIN_MEMORY = 16; // jrockit supports no less
    private static final long MIN_PU = 1;
```

APPENDIX A-continued

The following code defines an actual Java API for use with an embodiment of the current invention. It will be evident that other API's may be defined in other embodiments within the spirit and scope of the invention.

```
    private static final long MIN_NBW = 50; // 50kBit ~ modem speed
    private static final long MIN_DS = 500; // 0.5GB
    /**
     * The preferred constructor for JVMRequirements. Only specify how much
     * power you want. Power is not merely CPU-MHz, its actually bogo-mips used
     * for the application. This means JVM administration such as garbage
     * collection and compilation are not included in the measurement, and to
     * get more Power this system may for example give you more memory instead
     * of more CPUs.
     */
    public JVMRequirements(long minPU);
    /**
     * A simple constructor for JVMRequirements. Sets the default values
     * for all requirements.
     */
    public JVMRequirements( );
    public JVMRequirements(long minPU, long minMem, long minNB);
    public JVMRequirements(long minPU, long minMem, long minNB, long minDS);
}
public class JVMResources implements Serializable {
    /**
     * Return the number of powerunits in use (this is an average computed over
     * the last 3 seconds of how many "java operations" this JVM was
     * performing). The thinking is that a twice as fast machine should have the
     * capacity to perform twice as may PowerUnits, it is unclear if this will
     * be the case.
     */
    public long getPowerUnits( ) {
        return powerUnits;
    }
    /**
     * This is all the memory the JVM is using (including native memory and heap
     * memory)
     */
    public long getMemory( ) {
        return memory;
    }
    /**
     * Get the amount of local disk space currently used by this JVM
     */
    public long getDiskUsage( ) {
        return diskUsage;
    }
    /**
     * Get the network bandwidth (this is an average computed over the last 3
     * seconds)
     */
    public long getNetworkBandwidth( ) {
        return networkBandwidth;
    }
}
public interface JVMListener
{
    public void aboutToSuspend( );
    public void resumed( );
    /**
     * Called after a JVM has exited (shut down). The value passed in is the
     * exit code for the JVM (as returned by the process...
     * i.e. System.exit(value)
     */
    public void exited(int exitCode);
}
public interface ResourceBroker
{
    /**
     * Will return an array of the machines associated
     * with the ResourceBroker.
     */
```

APPENDIX A-continued

The following code defines an actual Java API for use with an embodiment of the current invention. It will be evident that other API's may be defined in other embodiments within the spirit and scope of the invention.

```
    Machine[ ] getMachines( );
    /**
     * Will return an array of JVMs that the ResourceBroker
     * thinks are currently running within its "domain".
     */
    JVM[ ]      getJVMs( );
    /**
     * A request is made from external source to remove a machine
     * from the pool (probably to put in another pool.).
     */
    public Machine relinquishMachine( );
    public void addMachine(Machine m);
}
/**
 * This interface represents something the jvm resource broker believes to be
 * an actual physical machine. If there is a hypervisor installed on the
 * machine the machine can be divided into multiple virtual machines on
 * demand by the resource broker.
 */
public interface Machine
{
    /**
     * Get the IP address of the machine in this LAN. All machines should
     * have exactly one IP-address in this LAN. (Then they may of course
     * be running multiple domains on the box where each may have a local
     * IP of its own.)
     */
    public InetAddress getAddress( );
    /**
     * Get a snapshot of how much of the machine resources currently
     * are in use. The machine resources are the big 4: CPU/Memory/
     * Disk/Network
     */
    public ResourceUsage getResourceUsage( );
    /**
     * Return the total amount of memory on the machine in MB.
     */
    public long getTotalMemory( );
    /**
     * Return the total amount of disk space on the machine in MB.
     */
    public long getTotalDiskSpace( );
    /**
     * Check whether the current machine has the support of a hypervisor
     * (and hence consequently can partition the box into multiple boxes
     * with resource guarantees, suspend/resume/migrate capabilities)
     */
    public boolean hasHypervisor( );
}
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the systems and methods described above are described in the context of a WebLogic application server and the JRockit JVM product, it will be evident that the system and methods may be used with other types of application servers, JVM and virtual machine product. Similarly, while the embodiments described above are described in the context of the Xen hypervisor, other types of hypervisor can be used. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer system for providing hardware virtualization, the computer system comprising:
   a microprocessor;
   a hypervisor executing on the computer system;
   a plurality of execution layer components executing on the hypervisor, wherein each execution layer component is adapted to exclusively execute a single java virtual machine which runs a respective single java-based application;
   wherein one of the execution layer components of the plurality of execution layer components accesses a feature provided by a traditional operating system executing in a traditional operating system layer operating in parallel with the plurality of execution layer components through the hypervisor; and
   wherein the hypervisor enables memory to be shared between two or more execution layer components of the plurality of execution layer components, and between the java virtual machines and the java-based applications running thereon.

2. The computer system of claim 1, wherein the hypervisor enables memory to be shared between two or more execution layer components of the plurality of execution layer components in an inverse-fork manner wherein the memory to be shared is identified after creation of the two or more execution layer components.

3. The computer system of claim 1, further comprising a resource broker agent configured to monitor said java virtual machines executing on the plurality of execution layer components.

4. The computer system of claim 1, further comprising a resource broker agent configured to monitor said java virtual machines executing on the plurality of execution layer components and use the hypervisor to create additional execution layer components and JVMs.

5. The computer system of claim 1, wherein the execution layer component associated with each java virtual machine informs the hypervisor of the presence of identical pages to be shared between the two or more execution layer components of the plurality of execution layer components.

6. The system of claim 1, wherein the feature provided by the traditional operating system is a device driver.

7. A method of providing hardware virtualization on a computer system comprising a microprocessor, the method comprising:
   providing a hypervisor executing on the computer system;
   providing a plurality of execution layer components executing on the hypervisor, wherein each execution layer component is adapted to exclusively execute a single java virtual machine which runs a respective single java-based application;
   accessing, by one of the execution layer components of the plurality of execution layer components, a feature provided by a traditional operating system executing in a traditional operating system layer operating in parallel with the plurality of execution layer components through the hypervisor; and
   enabling with the hypervisor, memory of said computer system to be shared between two or more execution layer components of the plurality of execution layer components, and between the java virtual machines and the java-based applications running thereon.

8. The method of claim 7, wherein the hypervisor enables memory to be shared between two or more execution layer components of the plurality of execution layer components in an inverse-fork manner wherein the memory to be shared is identified after creation of the two or more execution layer components.

9. The method of claim 7, further comprising providing a resource broker agent configured to monitor said java virtual machines executing on the plurality of execution layer components.

10. The method of claim 9, further comprising providing a resource broker agent configured to monitor said java virtual machines executing on the plurality of execution layer components and use the hypervisor to create additional execution layer components and JVMs.

11. The method of claim 10, wherein the execution layer component associated with each java virtual machine informs the hypervisor of the presence of identical pages to be shared between the two or more execution layer components of the plurality of execution layer components.

12. The method of claim 7, wherein the feature provided by the traditional operating system is a device driver.

13. A non-transitory computer readable storage medium, including instructions stored thereon for supporting providing hardware virtualization on a computer system comprising a microprocessor, which instructions, when read and executed, computer system to perform steps comprising:
   providing a hypervisor executing on the computer system;
   providing a plurality of execution layer components executing on the hypervisor, wherein each execution layer component is adapted to exclusively execute a single java virtual machine which runs a respective single java-based application;
   accessing, by one of the execution layer components of the plurality of execution layer components, a feature provided by a traditional operating system executing in a traditional operating system layer operating in parallel with the plurality of execution layer components through the hypervisor; and
   enabling with the hypervisor, memory of said computer system to be shared between two or more execution layer components of the plurality of execution layer components, and between the java virtual machines and the java-based applications running thereon.

14. The non-transitory computer readable storage medium of claim 13, wherein the hypervisor enables memory to be shared between two or more execution layer components of the plurality of execution layer components in an inverse-fork manner wherein the memory to be shared is identified after creation of the two or more execution layer components.

15. The non-transitory computer readable storage medium of claim 13, further comprising providing a resource broker agent configured to monitor said java virtual machines executing on the plurality of execution layer components.

16. The non-transitory computer readable storage medium of claim 15, further comprising providing a resource broker agent configured to monitor said java virtual machines executing on the plurality of execution layer components and use the hypervisor to create additional execution layer components and JVMs.

17. The non-transitory computer readable storage medium of claim 16, wherein the execution layer component associated with each java virtual machine informs the hypervisor of the presence of identical pages to be shared between the two or more execution layer components of the plurality of execution layer components.

18. The non-transitory computer readable storage medium of claim 15, wherein the feature provided by the traditional operating system is a device driver.

* * * * *

UNITED STATES PATENT AND TRADEMARK OFFICE
CERTIFICATE OF CORRECTION

PATENT NO. : 9,875,122 B2  
APPLICATION NO. : 14/172711  
DATED : January 23, 2018  
INVENTOR(S) : Dahlstedt Page 1 of 1

It is certified that error appears in the above-identified patent and that said Letters Patent is hereby corrected as shown below:

Page 2, Column 2, under Other Publications, Line 13, delete "w.datasynapse" and insert -- www.datasynapse --, therefor.

In Column 2, Line 61, delete "In" and insert -- in --, therefor.

In Column 9, Line 54, delete "Java" and insert -- java --, therefor.

In Column 12, Line 14, delete "suite" and insert -- suited --, therefor.

In Columns 11-12, Line 40, delete "previosuly" and insert -- previously --, therefor.

In Columns 15-16, Line 45, delete "advangtage" and insert -- advantage --, therefor.

Signed and Sealed this  
Fourteenth Day of August, 2018

Andrei Iancu  
*Director of the United States Patent and Trademark Office*